United States Patent [19]

Pekowski

[11] Patent Number: 5,946,486
[45] Date of Patent: Aug. 31, 1999

[54] APPARATUS AND METHOD FOR TRACING ENTRIES TO OR EXITS FROM A DYNAMIC LINK LIBRARY

[75] Inventor: Raymond Paul Pekowski, Austin, Tex.

[73] Assignee: International Business Machines Corporation, Armonk, N.Y.

[21] Appl. No.: 08/763,136

[22] Filed: Dec. 10, 1996

[51] Int. Cl.$^6$ .................................................. H04B 17/00
[52] U.S. Cl. ........................ 395/704; 395/710; 707/103
[58] Field of Search ................................... 395/704, 710, 395/702; 707/103

[56] References Cited

U.S. PATENT DOCUMENTS

| | | | |
|---|---|---|---|
| 5,247,678 | 9/1993 | Littleton | 395/700 |
| 5,247,681 | 9/1993 | Janis et al. | 395/700 |
| 5,339,430 | 8/1994 | Lundin et al. | 395/700 |
| 5,369,766 | 11/1994 | Nakano et al. | 395/700 |
| 5,369,770 | 11/1994 | Thomason et al. | 395/725 |
| 5,375,241 | 12/1994 | Walsh | 395/700 |
| 5,450,586 | 9/1995 | Kazura et al. | 395/700 |
| 5,454,086 | 9/1995 | Alpert et al. | 395/568 |
| 5,475,840 | 12/1995 | Nelson et al. | 395/700 |

OTHER PUBLICATIONS

"IBM OS/2 16–32–bit Object Module Format (OMF) and Linear eXecutable Module Format (LX), Revision 9," *IBM Corporation*, Nov. 1995.

"Windows 95 System Programming Secrets," *IDG Books Worldwide, Inc.*, pp. 685–705, 1995.

*Primary Examiner*—Thomas R. Peeso
*Attorney, Agent, or Firm*—Jeffrey S. LaBaw; David H. Judson

[57] ABSTRACT

An apparatus and method for tracing events occurring upon entries to or exits from a dynamic link library (DLL) without accessing or modifying the source code of the DLL is disclosed. The method includes generating a shadow dynamic link library which intercepts calls from a calling application program executable.

54 Claims, 15 Drawing Sheets

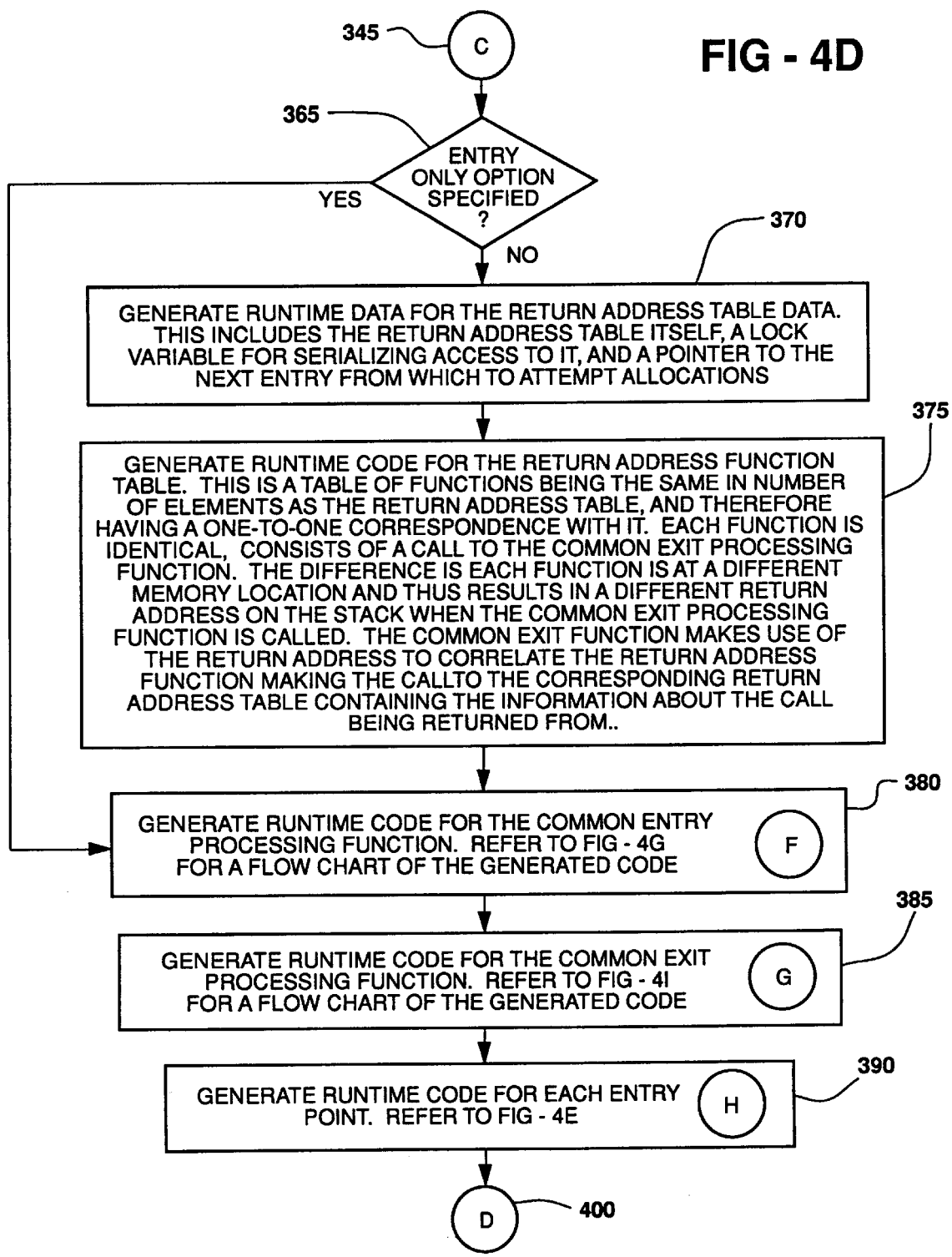

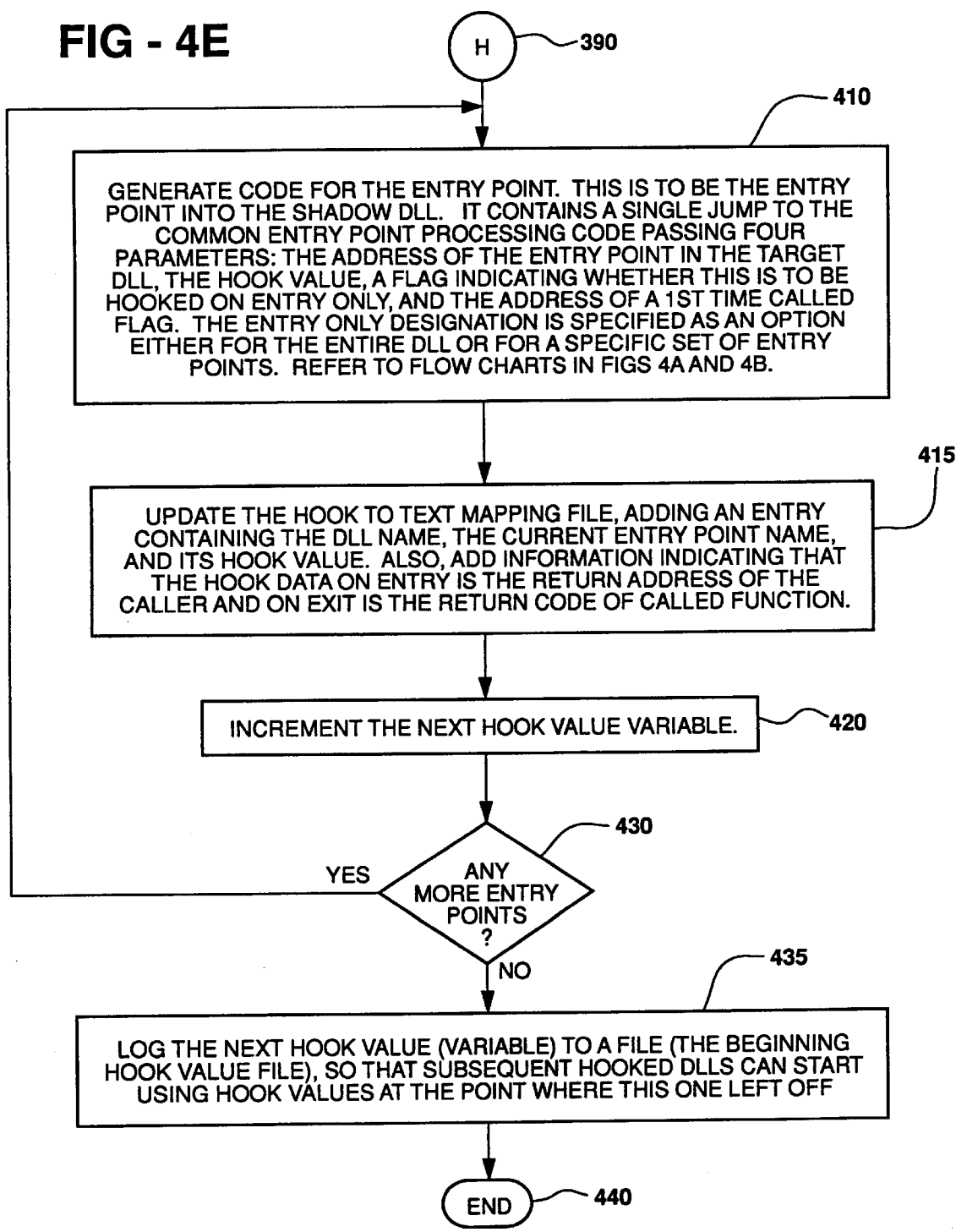

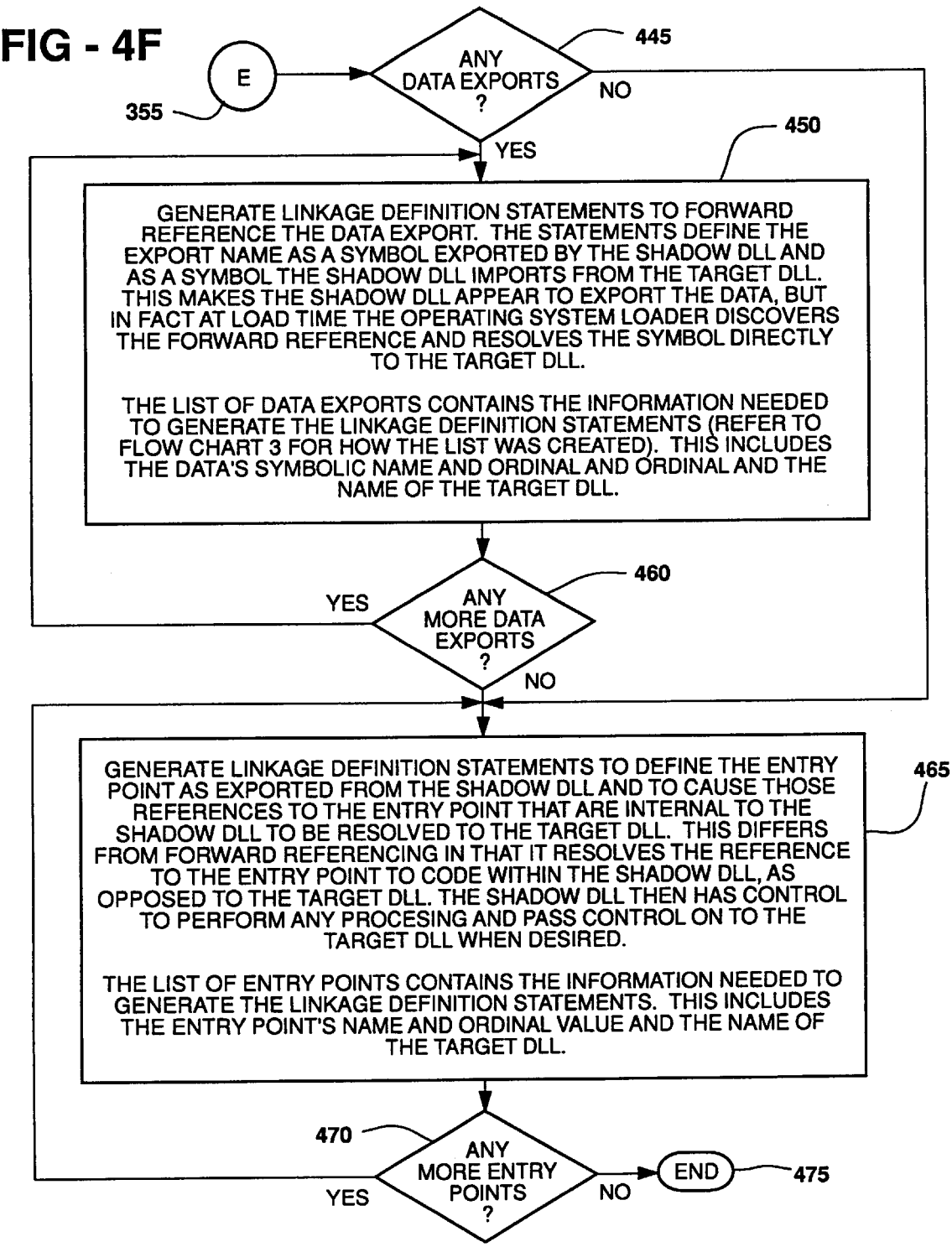

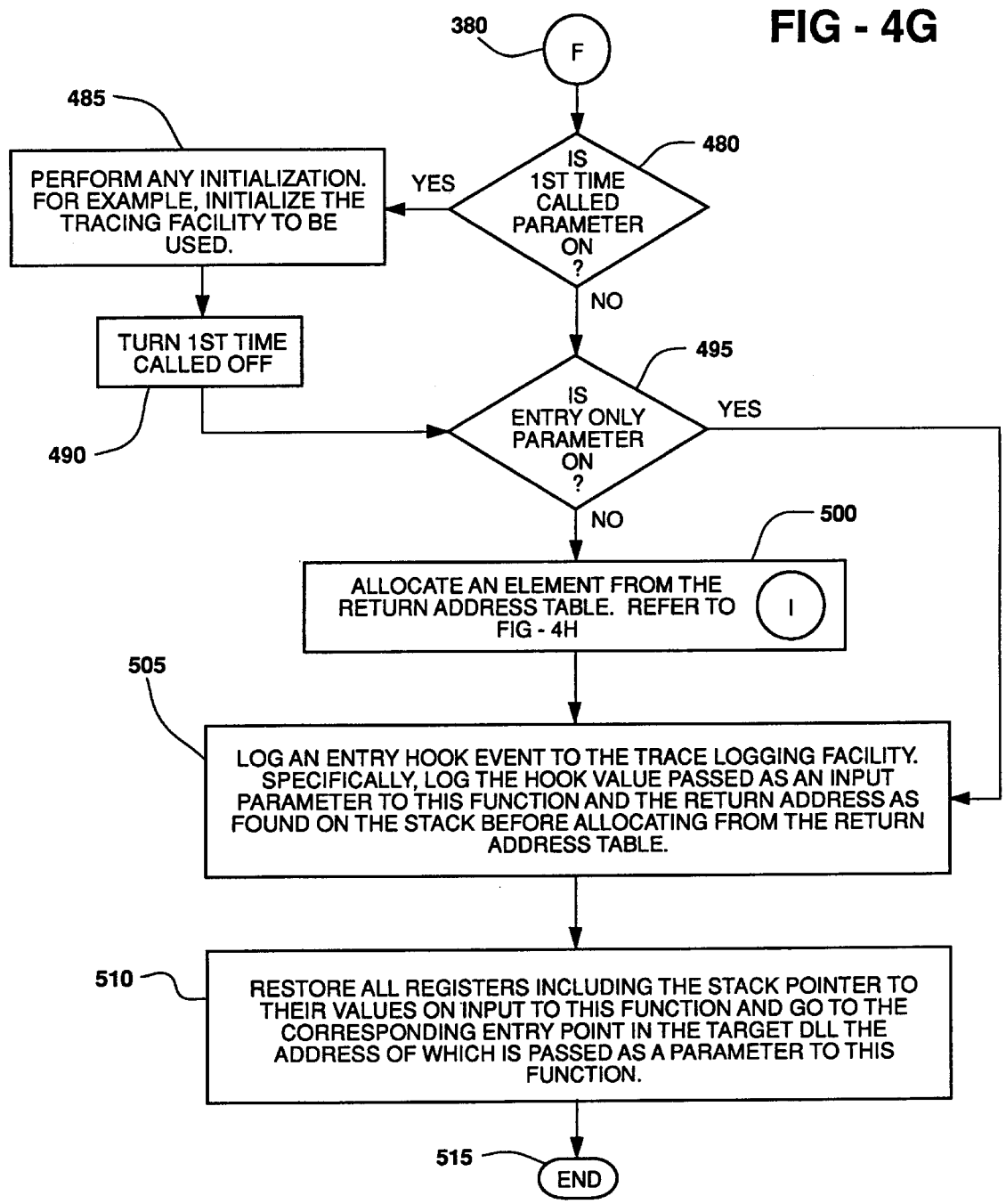

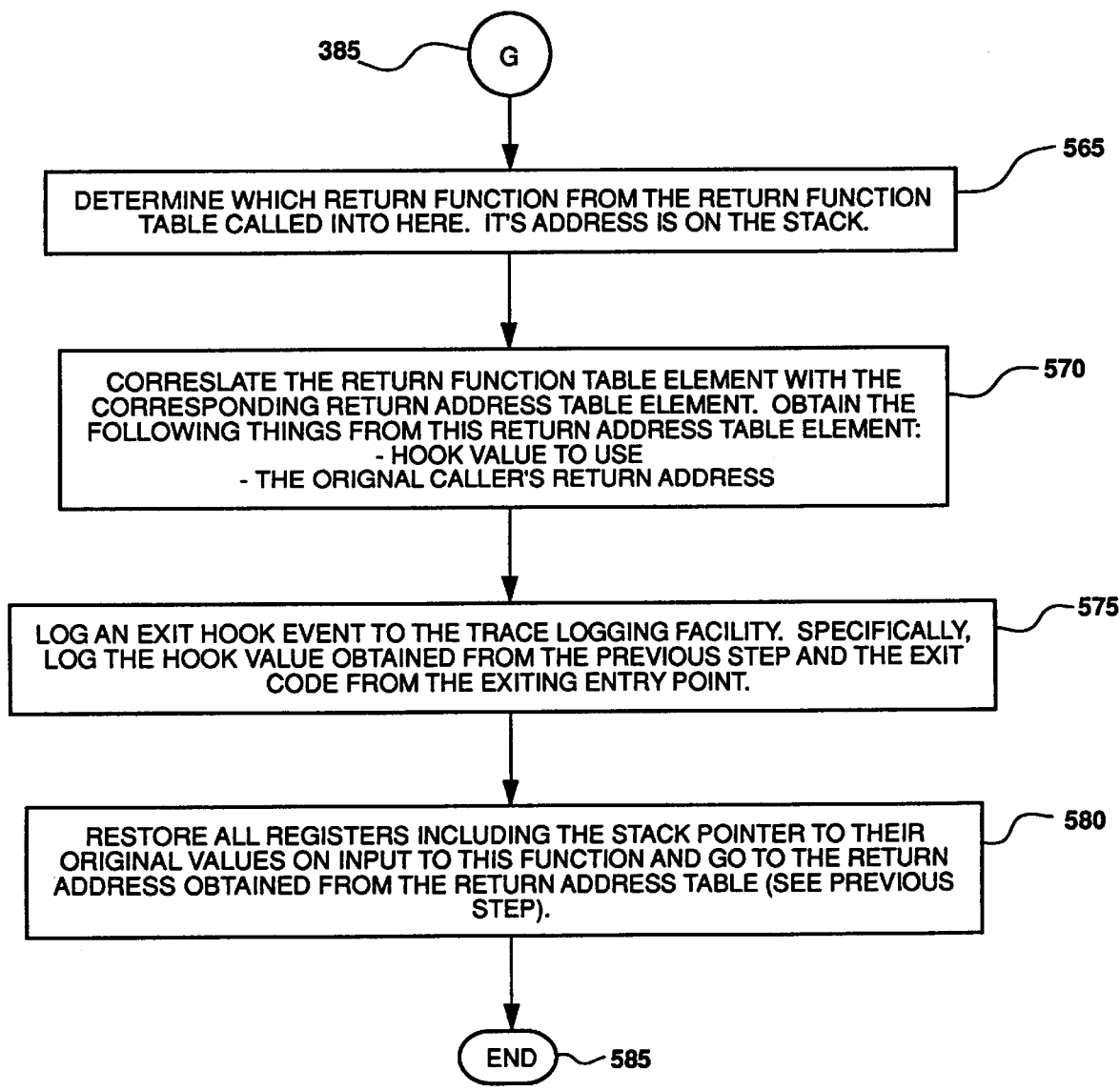

APPARATUS AND METHOD FOR TRACING ENTRIES TO OR EXITS FROM A DYNAMIC LINK LIBRARY

CROSS-REFERENCE TO RELATED APPLICATIONS

APPARATUS AND METHOD FOR DEMAND LOAD ANALYSIS, Ser. No. 08/763,135, incorporated herein by reference.

FIELD OF THE INVENTION

The present invention relates in general to information handling systems and more particularly to an apparatus and method for tracing entries to or exits from a software module utilized in a computer program. Specifically, the present invention relates to an apparatus and method for tracing entries to or exits from a dynamic link library (DLL).

BACKGROUND OF THE INVENTION

A computer application program usually includes a number of separate routines. Typically, the routines include a main program and several subsidiary routines referred to as objects, modules, or resources. Execution of the application program begins with the main program with calls being made to the subsidiary routines. To operate as a complete program, prior to execution these routines are linked together using a linker such as 386 link. The linker copies each of the routines into an executable file for the application program. The linker also provides each of the routines with information identifying the locations of other routines so that the routines can access each other. The executable file can then be loaded into the memory of a computer such that the application program can be executed by the computer according to the instructions in the routines.

A dynamic link library (DLL) is an executable module or routine containing services that application programs can call to perform useful tasks, e.g., directory searches, login commands, searching functions, character string manipulations, etc. DLLs exist primarily to provide services to application programs. These libraries play an important role in operating systems such as Windows and OS/2, which use them to make their services and resources available to application programs.

DLLs are similar to run-time libraries. The main difference between DLLs and run-time libraries is that DLLs are linked with the application program at run time, that is, when the computer is executing the application program, not when the application program files are linked with the linker. Linking a library with an application program at run time is referred to as dynamic linking; linking a library with an application program by using the linker is referred to as static linking. The discussion below focuses on the OS/2 operating system, but those of ordinary skill in the art will understand that the following discussion applies equally to other operating systems, such as Windows, which utilize DLLs.

To access a DLL at run time, the application program must be able to obtain information indicating where to find the DLL. One method provided by operating systems utilizing DLLs is to use an import library, or reference library, which contains information regarding where to locate the DLL at run time. During linking, the linker uses statically linked reference libraries to resolve references to external services. As noted above, when an application program desires a service from a static link library, the linker copies the code for that service into the application program's executable file. When the application program desires a service run from a DLL, however, the linker does not copy any code from the DLL. Instead, the linker searches all defined import or reference libraries to find one that contains the necessary information regarding location of the DLL. The linker copies the necessary information from the reference or import library to create a dynamic link between the executing application program and the DLL.

Performance analysis of a large software system with many DLLs can be very difficult. Many kinds of information are needed for the OS/2 operating system (OS/2 is a trademark of International Business Machines Corporation). A dekko hook/trace tool provides some, but not all of the needed information. The dekko hook/trace tool provides timing information on both operating system events as well as user-written events. The dekko hook/trace tool searches the syntax of a C source file for the entry and exits of routines and automatically inserts dekko hooks. One of the problems with the dekko hook/trace tool, and the suite of utilities that thus far have been written for it, is a mechanism to easily and automatically apply dekko hooks to new code has not been provided.

Other non-dekko based performance tools have tried to solve the automatic and ease of use hooking problem, but each is lacking in some respect. One particular problem is that prior art tools, including dekko, require some level of access to the source files used to build the executable of interest. Another problem is the processing overhead which prior art tools introduce in the software being analyzed. For example, the dekko hook/trace tool requires access to source code so it can be temporarily modified and recompiled. The IBMCPP Performance Analysis Tool requires a recompile of the source code with a compiler switch indicating to enable tracing. The IBMCPP Performance Analysis Tool is a tool which automatically hooks the entry and exits of routines and uses its own private trace log. MTrace is an instruction level trace tool which counts the number of instructions executed and accounts them to routine names. The MTrace tool does not require access to the source code, but does require a symbol table generated when the executable of interest was built and thus cannot be applied to off-the-shelf products. It is also difficult to set up and generates too much detail for some long-running scenarios. It does not provide real timing information, just instruction counts, and introduces a large amount of overhead. Each tool, dekko, IBMCPP, and MTrace, provide tracing of entries and exits of routines but exhibit common problems as identified above.

What is needed is a source code independent solution to the problem of automatic and easy hooking of new code, specifically addressing the hooking of entry and exit points of DLLs. What is also needed is a source code independent solution which does not introduce substantial processing overhead to the code being hooked.

The present invention may be utilized to perform analysis of DLL execution such as set forth in U.S. patent application Ser. No. 08/763,135, of common assignee herewith, to provide software routine timing information, to provide useful debugging information such as the status of certain parameters upon entry to or exit from software routines or to provide other similar information for program execution analysis.

SUMMARY OF THE INVENTION

Accordingly, the present invention provides a method and apparatus for automatically tracing new code in a software module without accessing or modifying the source code of the software module.

The present invention provides a method, implemented in an information handling system, for tracing events occurring upon entries to or exits from a named software module. The method comprises the steps of providing a software module having a name; generating a shadow software module having the same name as the software module for tracing events occurring upon entry to or exit from the software module and renaming the software module, thereby avoiding modifications to the software module.

The present invention also includes a method, implemented in an information handling system, for generating a shadow software module for tracing events occurring upon entry to and exit from a software module. The method comprises the steps of generating program code for an entry hook routine for performing a common entry processing function; and generating program code for an exit hook routine for performing a common exit processing function.

The present invention also includes a method, implemented in an information handling system, for generating a shadow software module for tracing events occurring upon entry to or exit from a named software module. The method comprises the steps of inputting the named software module; renaming the software module; generating a shadow software module having the same name as the software module by performing the following steps: generating program code for an entry hook routine for performing a common entry processing function; generating program code for an exit hook routine for performing a common exit processing function; generating a return address table having addressable entries for storing the address of a calling module and hook value for the called entry point; and generating a return address function table having an exit function for each entry in the return address table. The method also includes the step of outputting the shadow software module.

The present invention also includes a computer program product which implements the methods set forth above in a program of instructions stored on a program storage device readable by a computer system.

The present invention also provides an information handling system comprising at least one processor, memory operably associated with the processor, and an application program stored in the memory, wherein the application program includes a software module. The information handling system is characterized by a shadow software module stored in the memory for tracing events occurring upon entries to or exits from the software module without modifying the software module.

The main advantage of the present invention is providing tracing of entries to or exits from a software module without modification to the software module.

Another advantage of the present invention is providing an apparatus and method that is a tracing tool which automatically generates a shadow software module for tracing events occurring upon entry to or exit from a software module without modifying any code to the software module and without adding substantial processing overhead to the software module.

BRIEF DESCRIPTION OF THE DRAWINGS

FIGS. 4A–4I illustrate a detailed flow chart of the present invention.

DETAILED DESCRIPTION OF A PREFERRED EMBODIMENT OF THE INVENTION

In the following description, for purposes of explanation, specific program procedures, APIs, and configurations are set forth to provide a thorough understanding of the present invention. The preferred embodiment described herein is implemented with an OS/2 operating system created by IBM (OS/2 and IBM are registered trademarks of International Business Machines Corporation). However, it will be apparent to one skilled in the art that the present invention may be practiced without the specific details and may be implemented in various computer systems utilizing various operating systems and in various configurations or makes or models of tightly coupled processors or in various configurations of loosely coupled multiprocessor systems. The procedural descriptions and representations which follow are the means used by those skilled in the art to convey the substance of their work to others skilled in the art.

Figure 1:
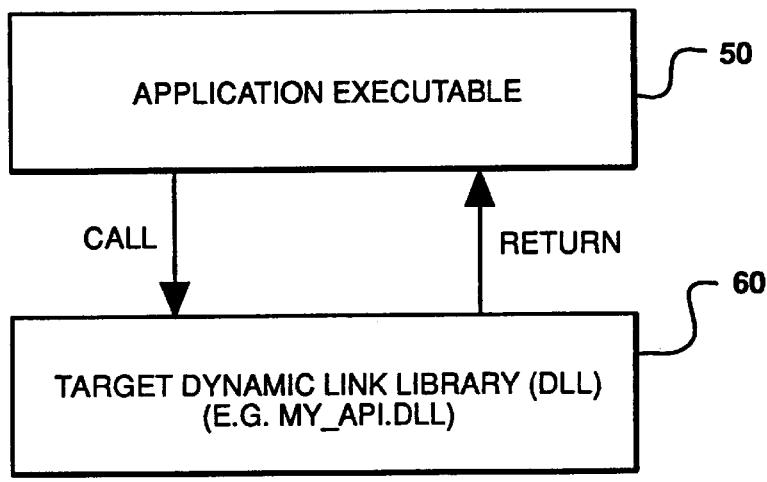
FIG. 1 is a block diagram illustrating an application program executable which utilizes a dynamic link library wherein no tracing is performed according to the present invention.

FIG. 1 illustrates an application executable 50 containing a call to a target DLL 60. After target DLL 60 completes its service, it then returns to application executable 50.

Figure 2:
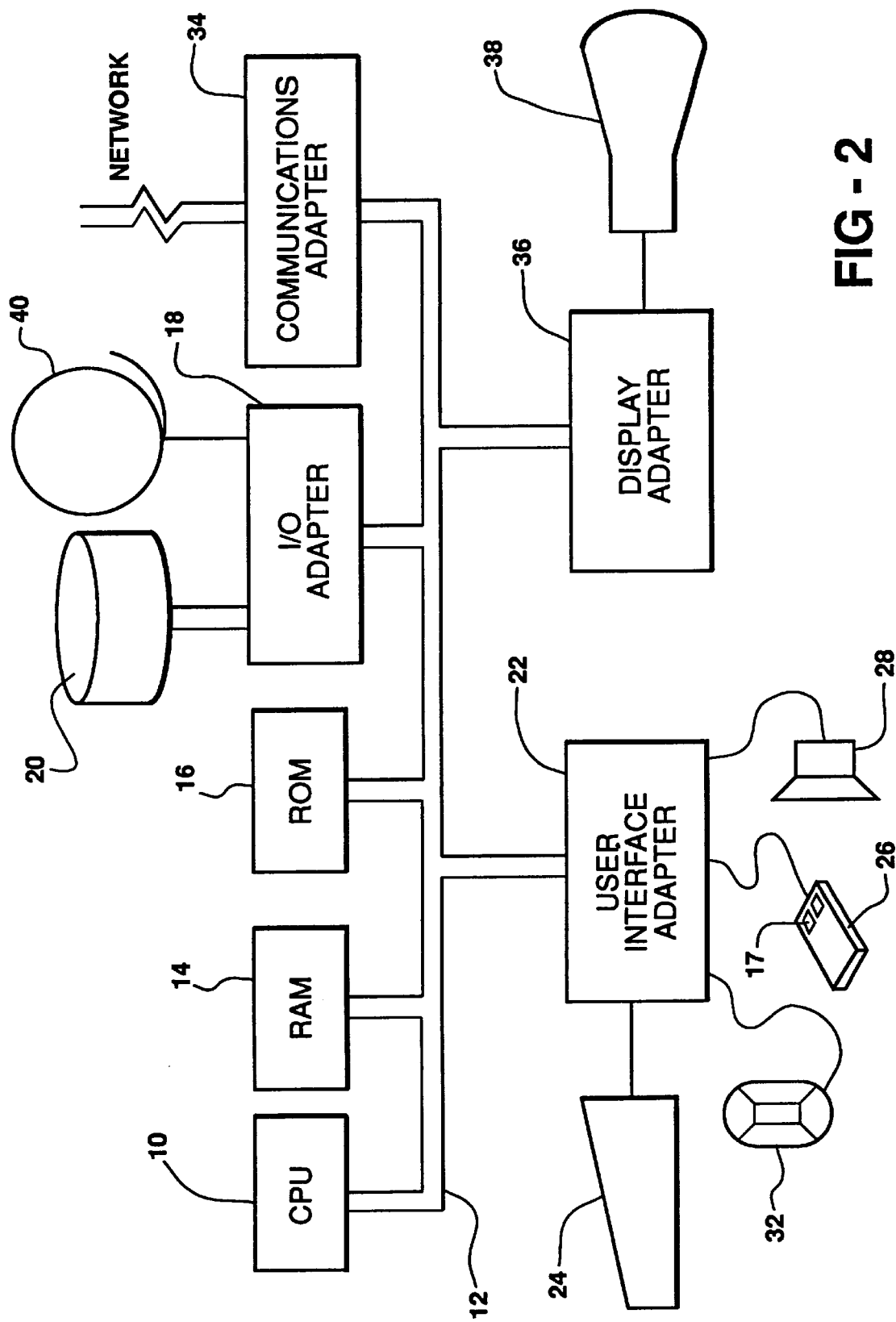
FIG. 2 is an information handling system embodying the present invention.

The detailed descriptions which follow are presented in terms of program procedures executed on or in an information handling system generically referred to as a computer or a network of computers. A representative hardware environment for practicing the present invention is depicted in FIG. 2, which illustrates a typical hardware configuration of a computer or information handling system in accordance with the subject invention, having at least one central processing unit (CPU) 10. CPU 10 is interconnected via system bus 12 to random access memory (RAM) 14, read only memory (ROM) 16, and input/output (I/O) adapter 18 for connecting peripheral devices such as disc units 20 and tape drives 40 to bus 12, user interface adapter 22 for connecting keyboard 24, mouse 26 having button 17, speaker 28, microphone 32, and/or other user interfaced devices such as a touch screen device (not shown) to bus 12, communication adapter 34 for connecting the information handling system to a data processing network, and display adapter 36 for connecting bus 12 to display device 38.

Figure 3:
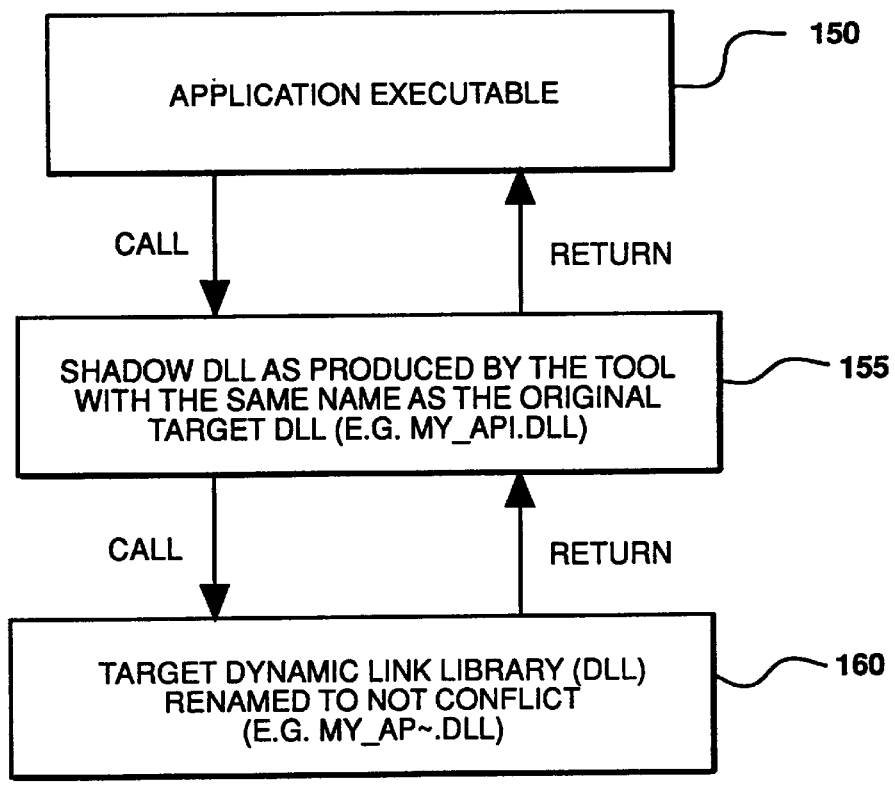
FIG. 3 is a block diagram illustrating an application program executable which utilizes a dynamic link library and tracing according to the present invention.

Referring now to FIG. 3, reference numerals which are like or similar to the reference numerals of FIG. 1 are intended to indicate like or similar steps. FIG. 3 illustrates a method and apparatus which is implemented in an information handling system having an operating system for tracing events occurring upon entries to or exits from a software module; specifically, a DLL. According to the present invention, a shadow DLL is generated in step 155. The shadow DLL is generated by an apparatus or method according to the present invention and has the same name as the original target DLL from step 160. The target DLL in step 160 is renamed so that the target DLL and the DLL do not conflict. In this manner, the shadow DLL acts as an interceptor of all calls being made to the target DLL, and thus each call to the target DLL and return from the target DLL passes through the shadow DLL. The shadow DLL can thereby trace events occurring upon entries to or exits from the target DLL. The shadow DLL is generated or built from information that is taken from the target DLL's linear EXE header. The format of the linear EXE header is documented in IBM OS/2 16/32-bit module format (OMF) and linear executable module (LX). Thus, the first step in generating or building the shadow DLL is finding all entry points into the dynamic link library as listed in the EXE header. For each DLL entry point listed in the EXE header, the following information is extracted: name of the DLL, the ordinal of the DLL, and the type of the DLL, that is whether it is 16-bit or 32-bit. The name, ordinal, and type are used to automatically generate assembly language routines which act as the resolution point for calls to the DLL by a calling executable from an application program. The details of building or generating a shadow DLL will be explained further in connection with the description of FIGS. 4A–4I. It will be appreciated that, although FIGS. 4A–4I specifically describe the method of building or generating a shadow DLL, the present invention is equally applicable to software modules other than DLLs. The assembly language routines are assembled into object code and then packaged together along with some initialization routines to produce a shadow DLL to perform program execution code tracing.

Figure 4A:
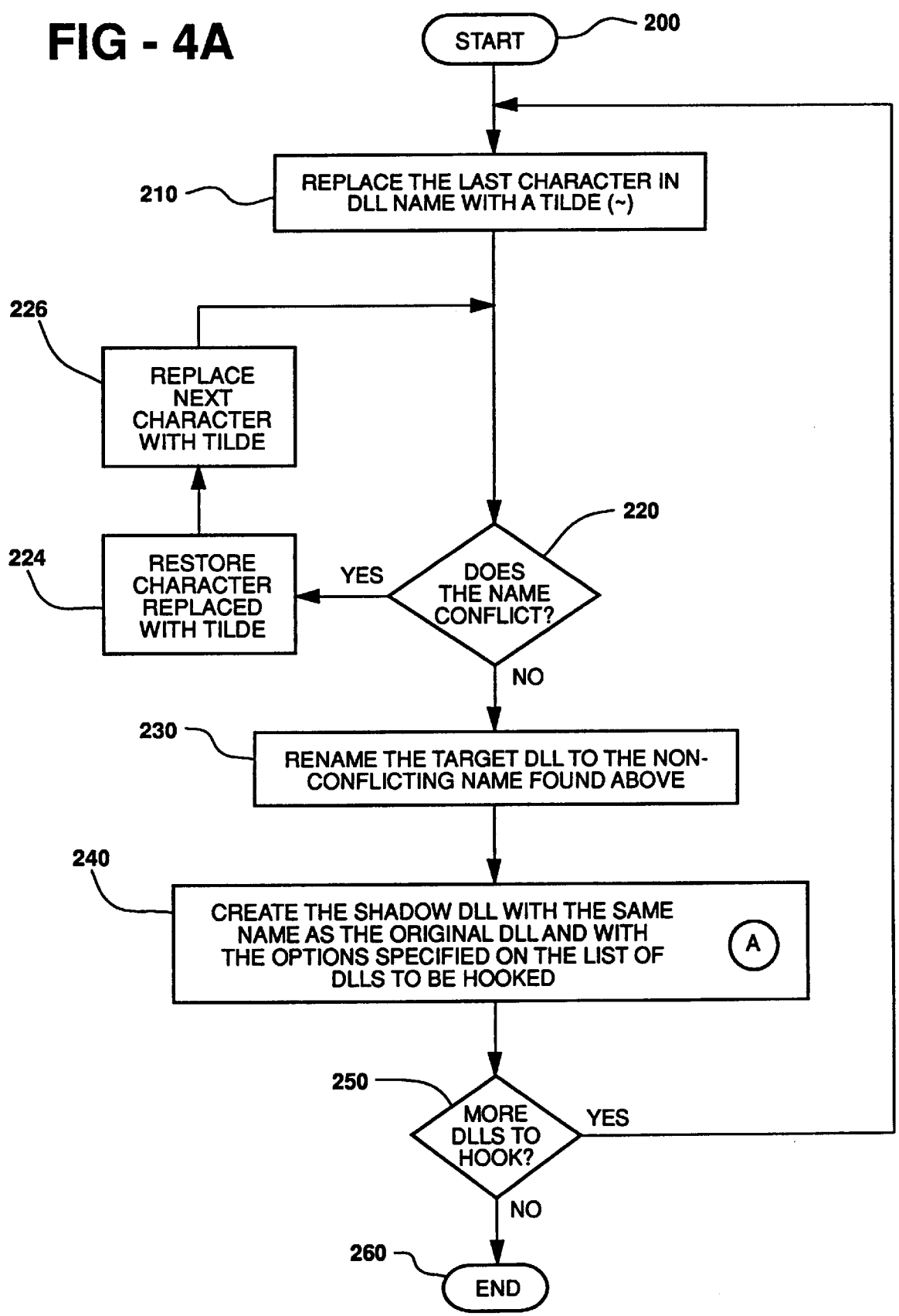

Referring now to FIGS. 4A–4I, a flowchart illustrating the present invention is shown. The process starts in step 200 as illustrated in FIG. 4A. The process first renames the original DLL, and then it creates a shadow DLL with the same name as the original DLL. Externally, the shadow DLL looks just like the original or target DLL. It has the same DLL name and the same name and number of external interfaces or exports as the original. The original DLL is renamed so that the shadow DLL can be given its name. All references to the original DLL get resolved to the shadow DLL. When called, the shadow DLL performs the entry hook processing and performs the call on the original DLL. When the original DLL returns from the call, the shadow DLL performs the exit hook processing and returns to the original caller.

Renaming the original DLL requires both the external and internal DLL names to be changed. The DLLRNANE tool from the IBMCPP compiler can be used, but does not work for lower case internal names. The present invention utilizes a similar utility to rename DLLs with both upper and lower case internal names. The OS/2 executable module format makes it difficult to rename a DLL to a name with a different length; therefore, in OS/2, the present invention uses a new name with the same length as the original. Name conflicts must be avoided. The name selection and conflict avoidance algorithm is illustrated in FIG. 4A. In step 210, the last character in the original DLL name is replaced with a tilde (˜) character. In step 220, the process determines whether there is a naming conflict between the renamed target DLL and any other software modules utilized in or by the application program executable. If no conflict exists, the process proceeds to step 230 wherein the target DLL is renamed to the non-conflicting name. If a conflict does exist, the process proceeds to step 224 wherein the character replaced with the tilde is restored. The process proceeds from step 224 to step 226 wherein the next character in the DLL name is replaced with a tilde. After the first iteration, the second to last character is changed, and the process proceeds in a similar manner until the last iteration wherein the first character of the name is changed. The process proceeds from step 226 and loops back to step 220 where it is determined whether a conflict exists. If there is still a name conflict after each character of the DLL name has been replaced with the tilde character, other special characters, like pound sign (#) and underscore (_) characters may be utilized in a similar fashion. The process then proceeds to step 240 wherein a shadow DLL with the same name as the original DLL and with options specified on a list of DLLs to be traced or hooked, is created in step 240. The process then proceeds to step 250 where it is determined whether there are any more DLLs to be hooked or traced. If there are more DLLs to be hooked or traced, the process returns to step 210. If there are no more DLLs to be hooked or traced, the process ends in step 260.

Figure 4B:
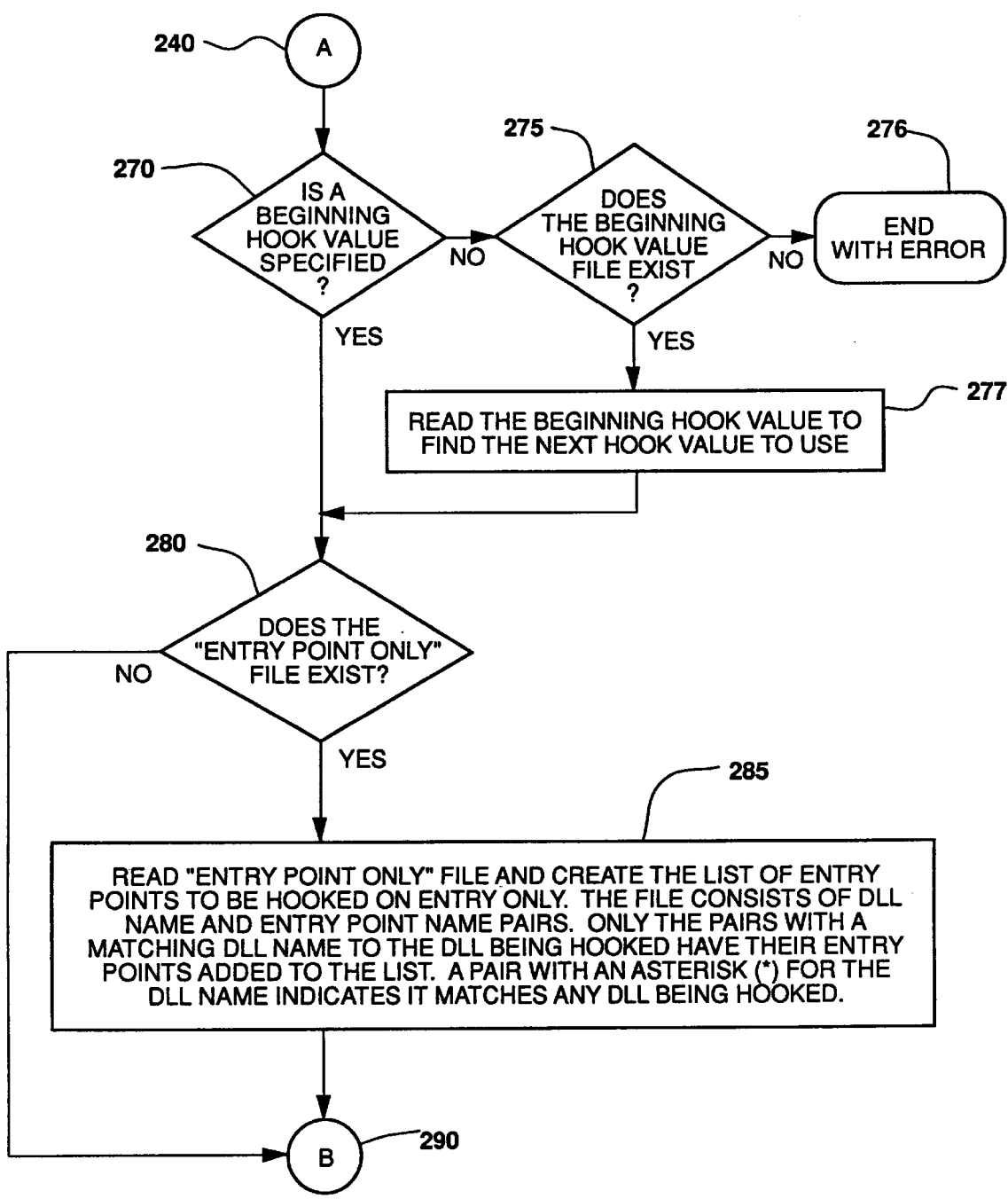

Referring now to FIG. 4B, step 240 includes the following substeps. In step 270, it is determined whether a beginning hook value is specified. If a beginning hook value is specified, the process proceeds to step 280. If a beginning hook value is not specified, the process proceeds to step 275. In step 275, it is determined whether a beginning hook value file exists. If no beginning hook value file exists, the process ends in step 276 with an error. If the beginning hook value file does exist, the process proceeds to step 277 wherein the beginning hook value file is read to find the next hook value to use. The process then proceeds to step 280. In step 280, a determination is made to determine if an entry point only file exists. If an entry point only file does not exist, the process proceeds to step 290. If an entry point only file does exist, the process proceeds to step 285. In step 285, the entry point only file is read, and a list of entry points to be hooked on entry only is created. The entry point only file consists of DLL name and entry point name pairs. Only the pairs with a matching DLL name to the DLL being hooked have their entry points added to the list. A pair with an asterisk for the DLL name indicates it matches any DLL being hooked. After completing step 285, the process proceeds to step 290.

Figure 4C:
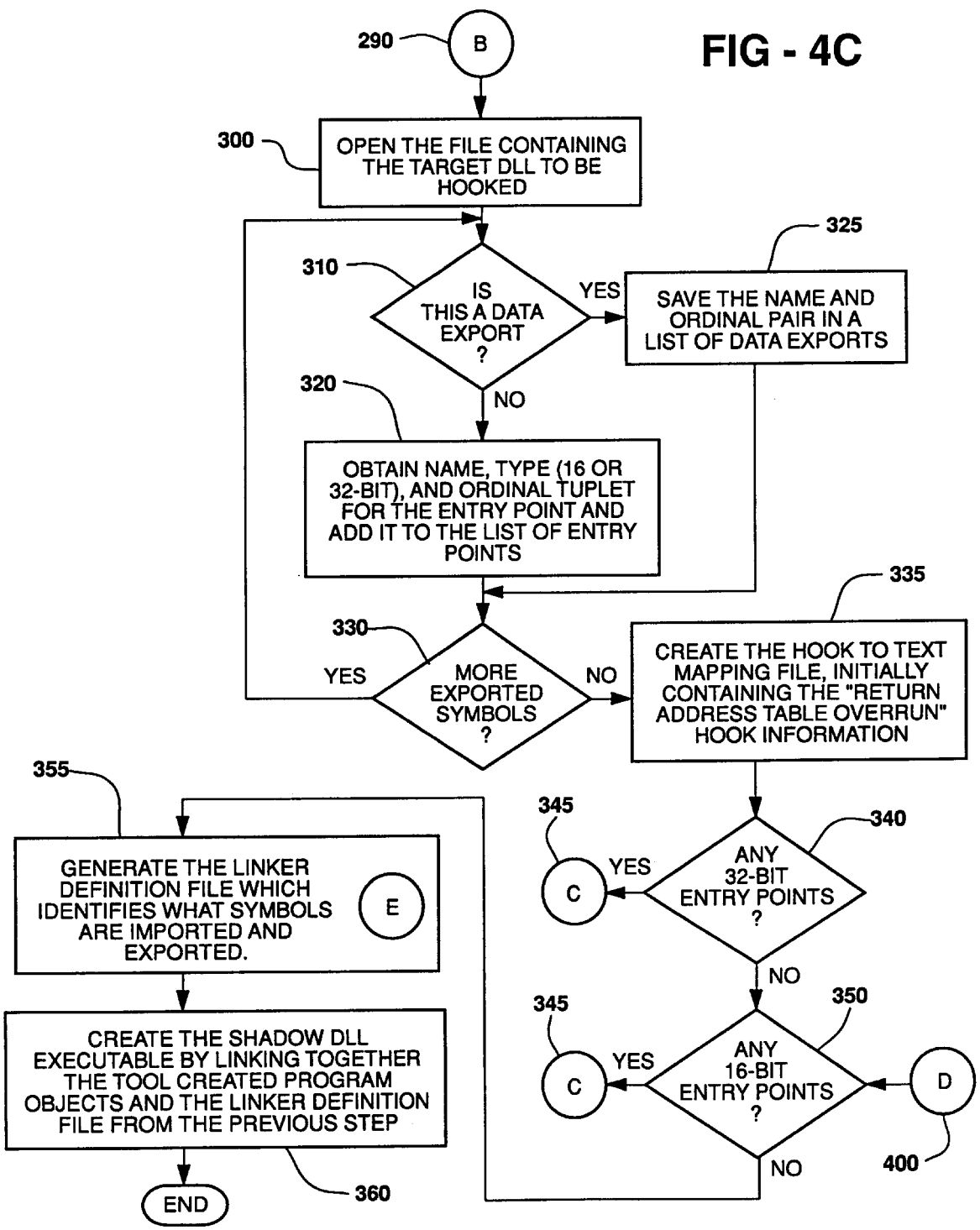

Referring now to FIG. 4C, the process for listing the entry points of the target DLL and creating the shadow DLL is illustrated starting with step 290. In step 300, a file containing the target DLL to be hooked is opened. In step 310, for each exported symbol of the target DLL, it is determined whether the export is a data export. If the export is not a data export, the process proceeds to step 320 where the name, type, and ordinal for the entry point is obtained and added to the list of entry points. If the export is a data export, the process proceeds to step 325 where the name and ordinal pair is saved in a list of data exports. After completing either step 320 or step 325, the process proceeds to step 330 where a determination is made whether there are any more exported symbols. If there are more exported symbols, the process returns to step 310. If there are no more exported symbols, the process proceeds to step 335 wherein a hook to text mapping file initially containing a return address table overrun hook information is created. The process then proceeds to step 340 where a determination is made whether any 32-bit entry points exist in the target DLL to be hooked. If the target DLL contains any 32-bit entry points, the process proceeds to step 345. In step 350, a determination is made whether there are any 16-bit entry points in the target DLL. If there are any 16-bit entry points in the target DLL, the process proceeds to step 345. If there are no 16-bit entry points in the target DLL, the process proceeds to step 355. In step 355, a linker definition file which identifies what symbols are imported and exported is generated. The process then proceeds to step 360 wherein the shadow DLL executable code is created by linking together the created program objects and the linker definition file from step 355.

From step 345, the process proceeds to step 365 wherein a determination is made whether an entry only option is specified (see FIG. 4D). If the entry only option is not specified, the process proceeds to step 370. In step 370, run time data for the return address table data is generated. This includes the return address table itself, a lock variable for serializing access to it, and a pointer to the next entry from which to attempt allocations. The process then proceeds to step 375 wherein run time code for the return address function table is generated. This is a table of functions having the same number of entries as the return address table and, therefore, a one-to-one correspondence with it. Each function is substantially similar in that it consists of a call to a common exit processing function. The difference is that each function is at a different memory location and thus results in a different return address on the stack when the common exit processing function is called. The common exit function makes use of the return address to correlate the return address function making the call to the corresponding return address table containing the information about the call being returned from. After completing step 375, the process proceeds to step 380. If the entry only option is not specified in step 365, the process proceeds to step 380, thereby skipping steps 370 and 375. In step 380, run time code for a common entry processing function is generated. The process proceeds from step 380 to step 385 wherein run time code for a common exit processing function is generated. In step 390, run time code for each entry point is generated. The process then proceeds to step 400.

Referring to FIG. 4E, the substeps of step 390 are illustrated. In step 410, code for the entry point is generated. The code, preferably written in assembly language, is a single jump to the common entry point processing code passing four parameters: the address of the entry point in the target DLL, the hook value, a flag indicating whether this is to be hooked on entry only, and the address of a first time called flag. The entry only designation is specified as an option, either for the entire DLL or for a specific set of entry points. After completing step 410, the process proceeds to step 415 wherein the hook to text mapping file is updated by adding an entry containing the DLL name, the current entry point name and its hook value. Also, information indicating that the hook data on entry is the return address of the caller and on exit is the return code of the called function is added. In step 420, the hook value variable is incremented. In step 430, a determination is made whether there are any more entry points. If there are more entry points, the process returns to step 410. If there are no more entry points, the process proceeds to step 435 wherein the next hook value variable is logged to a file referred to as the beginning hook value file so that subsequent hooked DLLs can start using hook values at the point where this one left off. The process then proceeds to step 440 where the substeps of process 390 are complete.

Referring now to FIG. 4F, the subprocesses of step 355 will be described. In step 445, a determination is made whether there are any data exports. If there are data exports as determined in step 445, the process proceeds to step 450 wherein linkage definition statements are generated to forward reference the data export. The statements define the export name as a symbol exported by the shadow DLL and as a symbol the shadow DLL imports from the target DLL. This makes the shadow DLL appear to export the data but, in fact, at load time the operating system loader discovers the forward reference and resolves the symbol directly to the target DLL. The list of data exports contains the information needed to generate the linkage definition statements. This includes the data's symbolic name and ordinal and the name of the target DLL. The process then proceeds to step 460 where a determination is made whether there are any more data exports. If there are any more data exports, the process returns to step 450. If there are no data exports, as determined in step 445, the process proceeds directly to step 465 wherein linkage definition statements to define the entry point as exported from the shadow DLL and to cause those references to the entry point that are internal to the shadow DLL to be resolved to the target DLL are generated. This differs from forward. referencing in that it resolves the reference to the entry point to code within the shadow DLL as opposed to the target DLL. The shadow DLL then has control to perform any processing and pass control on to the target DLL when desired. The list of entry points contains the information needed to generate the linkage definition statements. This includes the entry point's name, ordinal value and the name of the target DLL. After completing step 465, the process proceeds to step 470 where a determination is made whether there are any more entry points in the list of entry points. If there are any more entry points, the process returns to step 465. If there are no more entry points, the process proceeds to step 475 wherein the substeps of step 355 are complete and a linker definition file is ready for use.

Referring now to FIG. 4G, the substeps of step 380 will be described. In step 480, a determination is made whether a first time called parameter is on. If the first time called parameter is on, the process proceeds to step 485. In step 485, any required initialization is performed. For example, a tracing logging facility to be used is initialized. After initialization is completed in step 485, the process proceeds to step 490 where the first time called parameter is turned off wherein the process then proceeds to step 495. If it is determined that the first-time-called parameter is off in step 480, the process proceeds directly to step 495. In step 495, a determination is made whether the entry-only parameter is on. If the entry-only parameter is not on as determined in step 495, the process proceeds to step 500 wherein an element from the return address table is allocated. After completion of step 500, the process proceeds to step 505. If the entry-only parameter is on, the process proceeds directly to step 505 bypassing step 500. In step 505, an entry hook event is logged to the trace logging facility, specifically the hook value passed as an input parameter to this function, and the return address as found on the system or program stack is logged to the trace logging facility. The process then proceeds to step 510 wherein all registers are restored to their values on input to this function. The process then jumps to the corresponding entry point in the target DLL, the address of which was passed as a parameter to this function. The substeps of step 380 then end in step 515.

Figure 4H:
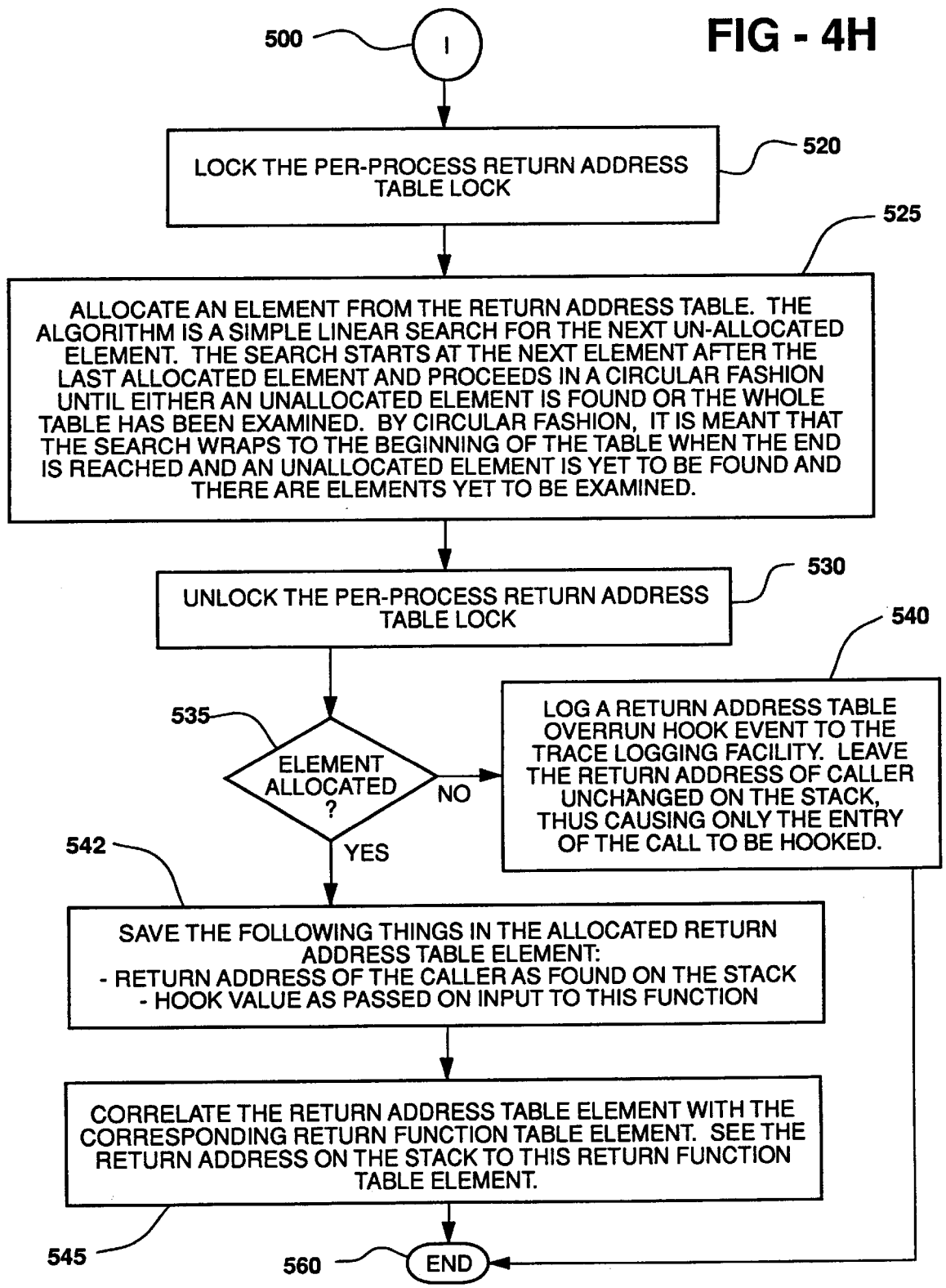

Referring now to FIG. 4H, the process for allocating a return address table element in step 500 will be further described with references to the sub-method steps. In step 520, a per process return address table lock is locked. In step 525, an element from the return address table is allocated. The algorithm is a simple linear search for the next unallocated element. The search starts at the next element after the last allocated element and proceeds in a circular fashion, until either an unallocated element is found or the whole table has been examined. By circular fashion, it is meant that the search wraps to the beginning of the table when the end is reached and an unallocated element is yet to be found, and there are elements yet to be examined. In step 530, the per process return address table lock is unlocked. In step 535, a determination is made whether a return address table element was allocated. If a return address table element was not allocated, the process proceeds to step 540 where a return address table overrun hook event is logged to the trace logging facility. The return address of the caller is left unchanged on the program or system stack, causing only the entry of the call to be hooked. After completion of step 540, the process proceeds to step 560 where the process for allocating a return address table element ends. If an element was allocated as determined in step 535, the process proceeds to step 542 where the following things are saved in the allocated return address table element: the return address of the caller as found on the program or system stack, and the hook value as passed on input to this function. After completion of step 542, the process proceeds to step 545 wherein the return address table element is correlated with the corresponding return function table element. The return address on the program or system stack is set to this return function table element. After completion of step 545, the process proceeds to step 560 where the process for allocating a return address table element is completed.

Referring now to FIG. 4I, the substeps of the process in step 385 for generating run time code for the common exit processing function will be described. In step 565, a determination is made which return function from the return function table called into the common exit processing code. The address of the calling return function is on the program or system stack. In step 570, the return function table element is correlated with the corresponding return address table element. The hook value to use and the original caller's return address is obtained from the return address table element. In step 575, an exit hook event is logged to the trace logging facility, specifically the hook value obtained from the previous step 570 and the exit code from the exiting entry point is logged to the trace locking facility. The process then proceeds to step 580 where all registers are restored to their original values on input to this function. The process jumps to the return address obtained from the return address table. After completion of step 580, the process for common exit processing is completed in step 585.

Figure 5A:
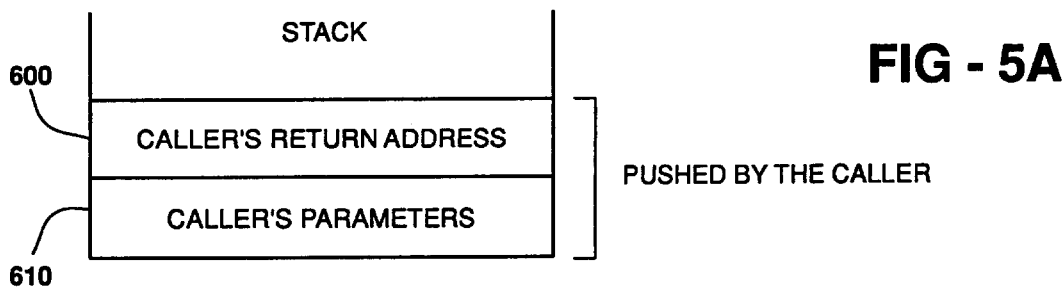
FIGS. 5A–5F illustrate system or program stack and return address table contents according to the present invention.
Figure 5B:
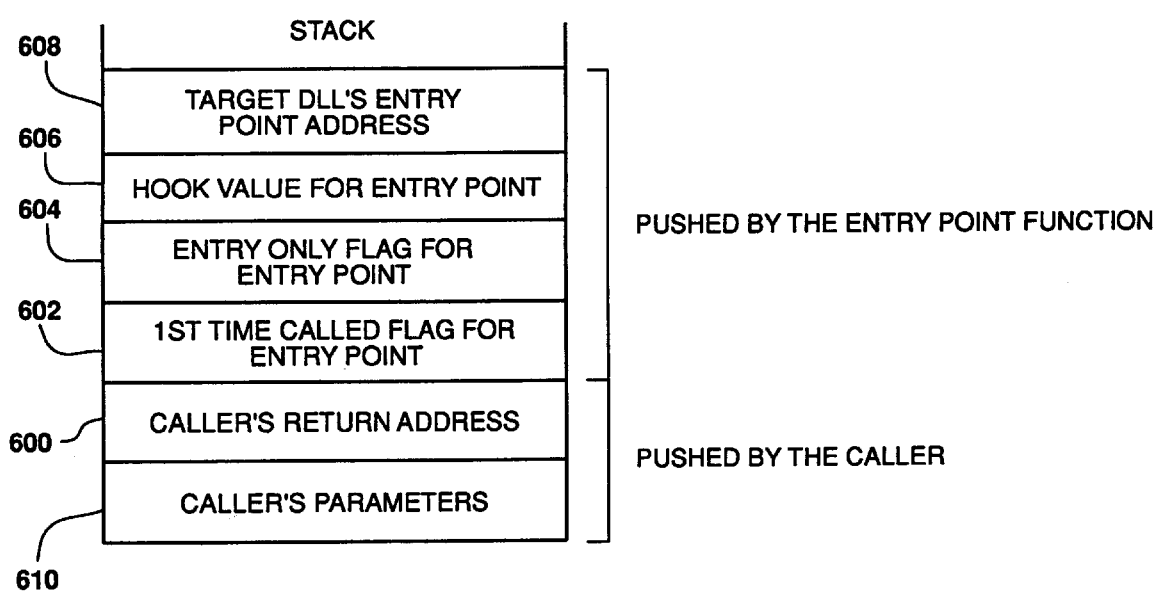
Figure 5C:
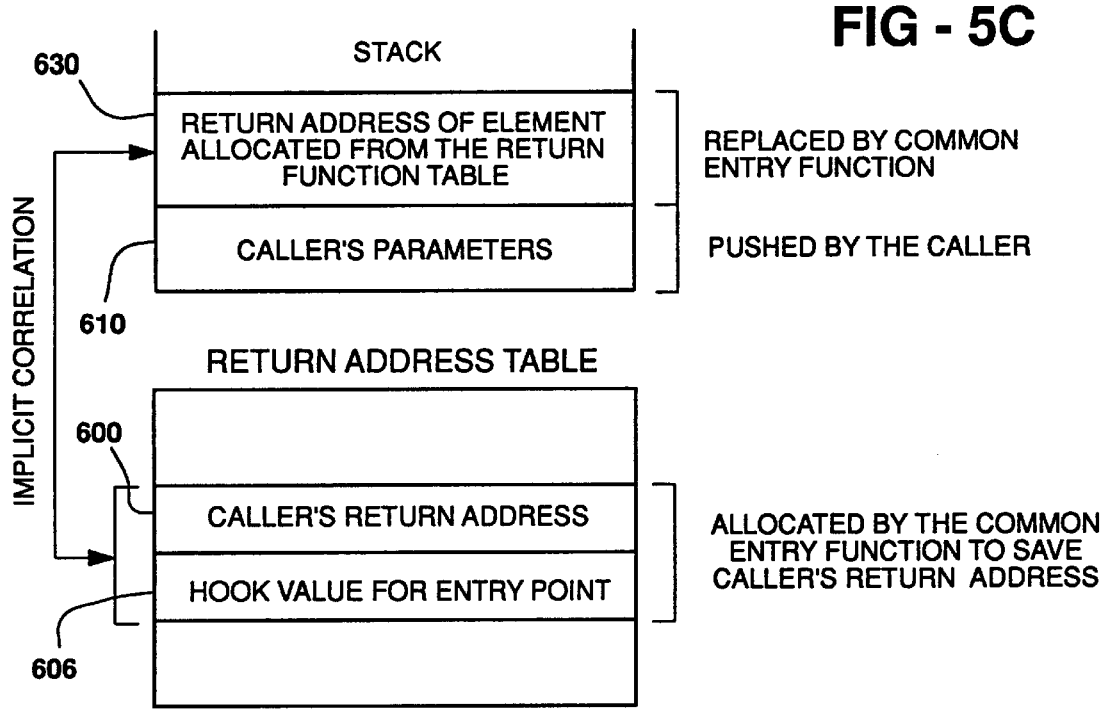
Figure 5D:
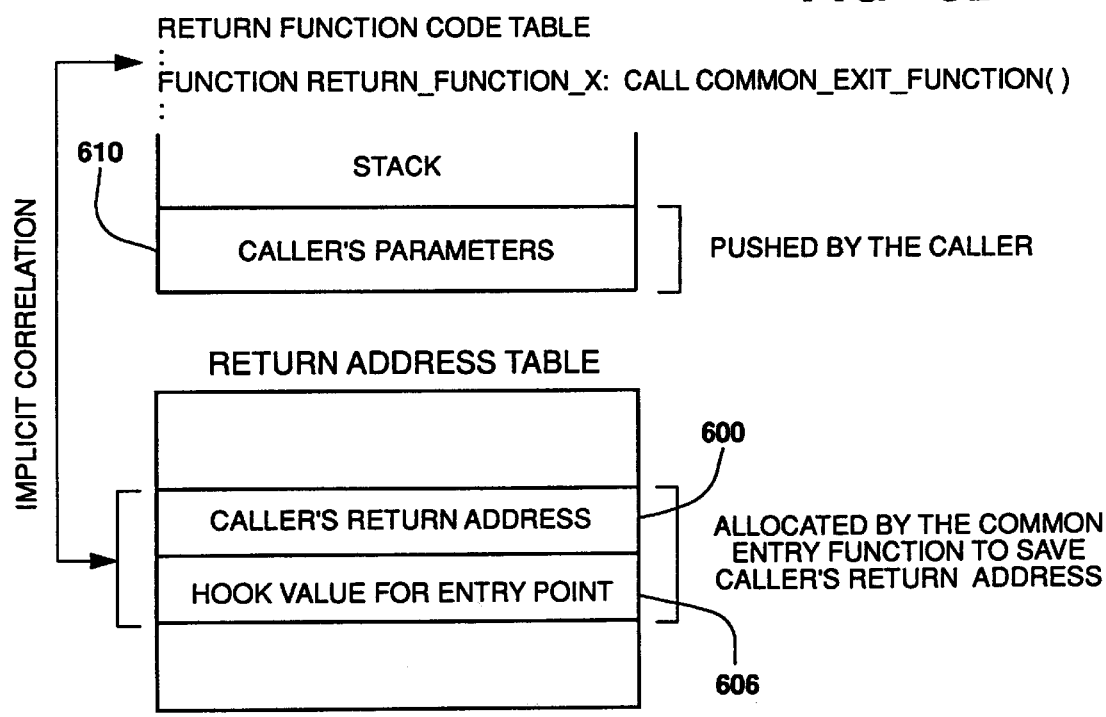
Figure 5E:
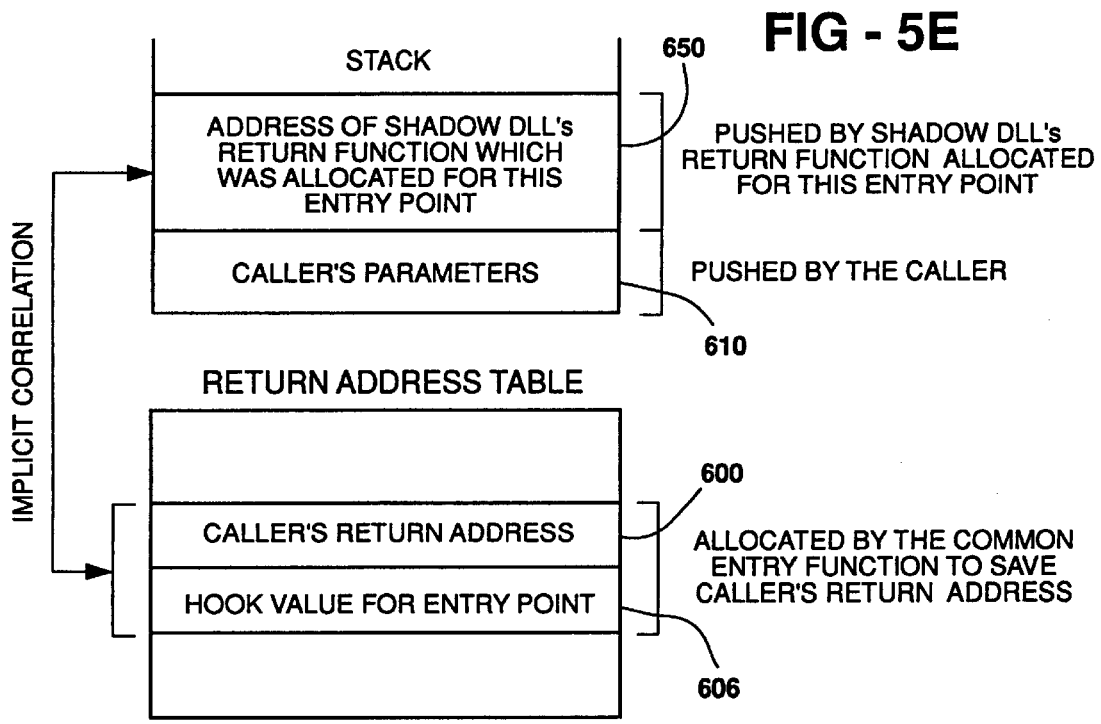
Figure 5F:
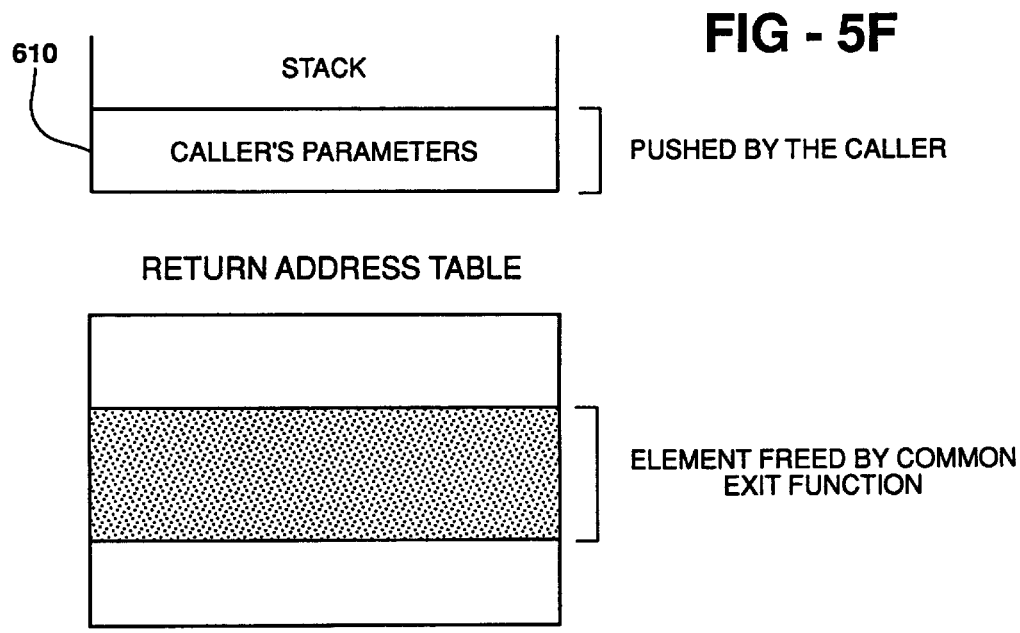

Referring now to FIGS. 5A–5E, the program or system stack and return address table contents will be described at various operating points of the method and apparatus of the present invention. At the shadow DLL's entry point function, the stack contains the caller's return address 600 and the caller's parameter 610 pushed onto the stack by the caller (see FIG. 5A). At the shadow DLL's common entry function, the stack contains the caller's return address 600, the caller's parameters 610, the first time called flag 602, entry only flag 604, hook value 606, and target DLL's entry point address 608. Whereas the caller's return address 600 and caller's parameters 610 are pushed by the caller onto the stack, the first time called flag 602, entry only flag 604, hook value 606, and target DLL's entry point address 608 are pushed by the entry point function onto the stack (see FIG. 5B). At the target DLL's entry point function, the stack contains the caller's parameters 610 pushed onto the stack by the caller and the return address 630 of element allocated from the return function table replaced by the common entry function (see FIG. 5C). The return address table contains the caller's return address 600 and the hook value 606 for entry point allocated by the common entry function to save caller's return address. There exists an implicit correlation between caller's return address 600 and hook value 606 in the return address table and the return address 630 of element allocated from the return function table in the stack. At the shadow DLL's return function allocated for this entry point, the stack contains the caller's parameters 610 pushed by the caller onto the stack. The return address table contains the caller's return address 600 and the hook value 606 allocated by the common entry function to save the caller's return address. Note that there is an implicit correlation between the caller's return address 600 and hook value 606 in the return address table and the DLL's return function allocated for this entry point (see FIG. 5D). At the shadow DLL's common exit function, the stack contains the caller's parameters 610 pushed onto the stack by the caller and the address 650 of the shadow DLL's return function which was allocated for this entry point pushed onto the stack by the shadow DLL's return function allocated for this entry point. The return address table contains the caller's return address 600 and the hook value 606 allocated by the common entry function to save the caller's return address. Again, there is an implicit correlation between caller's return address 600 and hook value 606 and the address 650 of the shadow DLL return function which was allocated for this entry point (see FIG. 5E). At the return to the original caller, the stack contains the caller's parameters 610 pushed onto the stack by the caller. The return address table is freed by the common exit function (see FIG. 5F).

Figure 6:
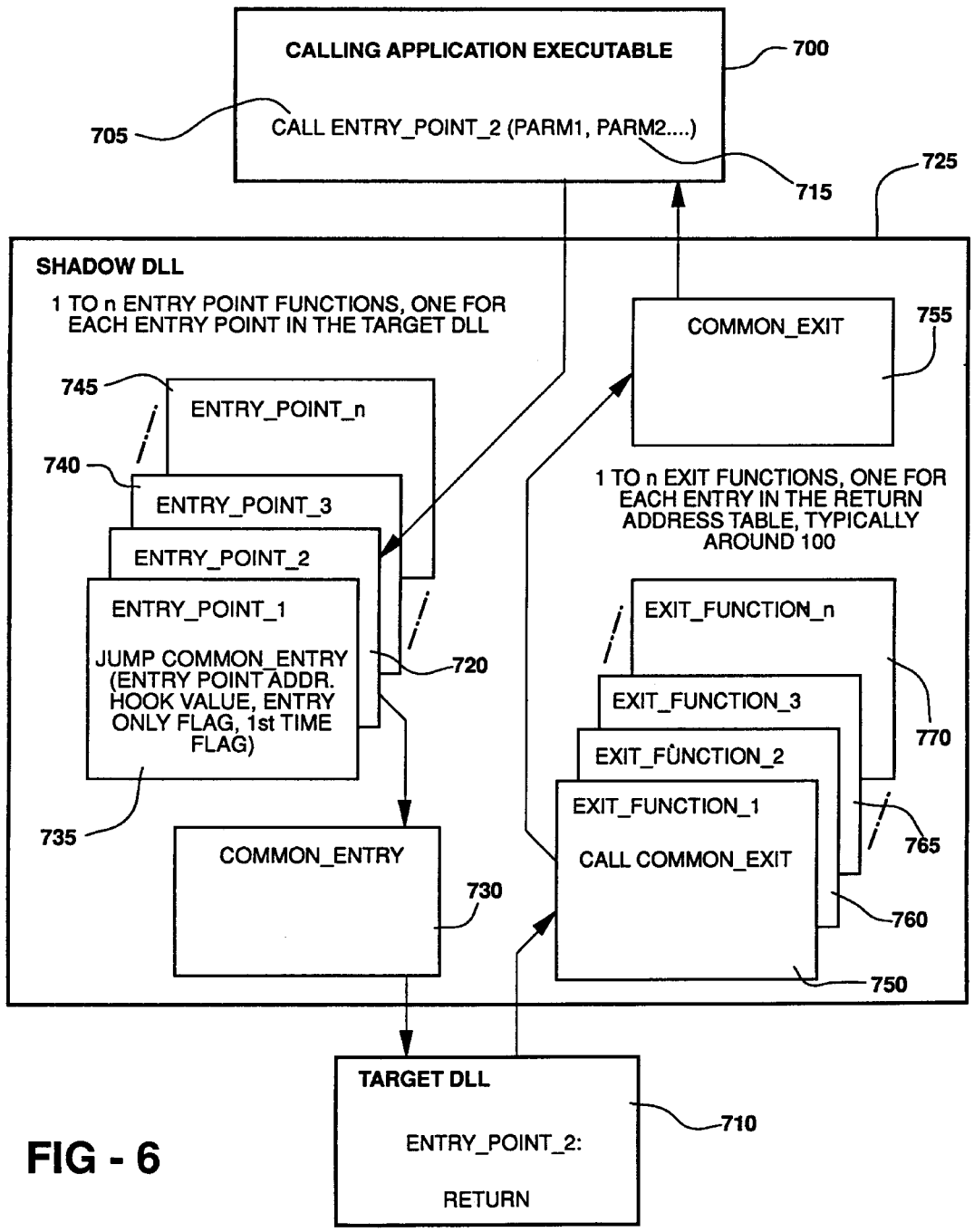
FIG. 6 illustrates an example of the contents of a calling application program executable, a shadow dynamic link library, and a target dynamic link library according to the present invention.

Referring now to FIG. 6, an example of the contents of and operation of the apparatus and method of the present invention will be described. Calling application executable program 700 contains a call to a specific entry point of a target DLL 710. The entry point call 705 contains references to call parameters 715. Call 705 to the entry point to target DLL 710 calls corresponding entry point function 720 in shadow DLL 725. Entry point 720 contains programming code which contains the instruction of jumping to common entry code 730 while passing the parameters of entry point address, hook value, entry only flag, and first time flag. Shadow DLL 725 contains entry point functions 735, 740, 745 for each entry point in the target DLL 710. After jumping to the common entry code 730, the common entry then jumps to target DLL 710 which then returns to exit function 750 in shadow DLL 725. It will be appreciated that there is no relationship between the entry point called and the return function table entry used. Simply, the next available return function is used. Exit function 750 contains a call to a common exit function 755. Shadow DLL 725 contains exit functions 760, 765, and 770, one for each entry in the return address table. Common exit function 755 returns to the calling application program executable 700.

Although the present invention and its advantages have been described in detail, it should be understood that various changes, substitutions and alterations can be made herein without departing from the spirit or scope of the invention as defined in the appended claims.

What is claimed is:

1. A method implemented in an information handling system for tracing events occurring upon entries to or exits from a named software module, said method comprising the steps of:

providing a software module having a name;

generating a shadow software module having the same name as the software module for tracing events occurring upon entry to or exit from the software module; and renaming the software module, thereby avoiding modifications to the software module.

2. The method, as recited in claim 1, wherein the step of generating a shadow software module comprises the steps of:

generating program code for an entry hook routine for performing a common entry processing function; and generating program code for an exit hook routine for performing a common exit processing function.

3. The method, as recited in claim 2, wherein the common entry processing function includes the step of logging an entry hook event to a trace logging facility and wherein the common exit processing function includes the step of logging an exit event to the trace logging facility.

4. The method, as recited in claim 2, further comprising the steps of:
  determining whether said software module contains any data exports; and
  bypassing, for each data export, the entry and exit routines.

5. The method, as recited in claim 2, further comprising the step of generating program code for performing the following steps for each entry point of the software module:
  jumping to the entry hook routine; and
  passing parameters to the entry hook routine including information for indicating whether the exit hook routine will be performed.

6. The method, as recited in claim 2, further comprising the steps of:
  generating a return address table having addressable entries; and
  generating a return address function table having an exit function for each entry in the return address table.

7. The method, as recited in claim 6, further comprising the steps of:
  determining whether the exit hook routine will be performed; and
  if the exit hook routine will be performed, then allocating an entry from the return address table.

8. The method, as recited in claim 7, further comprising the steps of:
  calling, from a caller, the name of the software module to call the shadow software module; and
  storing the caller's return address on a stack.

9. The method, as recited in claim 8, further comprising the steps of:
  removing the caller's return address from the stack;
  storing the caller's return address in the allocated entry of the return address table; and
  storing, in the stack, a return address of an exit function corresponding to the allocated entry.

10. The method, as recited in claim 9, further comprising the steps of:
  returning, using the return address of the exit function in the stack, to the exit function corresponding to the allocated entry of the return address table;
  calling, by the exit function, the exit hook routine;
  storing the return address of the exit function in the stack;
  retrieving the caller's return address from the allocated entry of the return address table corresponding to the exit function; and
  returning to the caller.

11. The method, as recited in claim 1, wherein the step of renaming the software module comprises the steps of:
  a) renaming the software module to a new name;
  b) determining whether other software modules have the same name as the new name; and
  c) repeating steps a) and b) until no other software modules have the same name as the new name.

12. The method, as recited in claim 1, wherein said software module and said shadow software module are dynamic link libraries.

13. The method, as recited in claim 1, wherein said software module and said shadow software module are object modules.

14. A method, implemented in an information handling system, for generating a shadow software module for tracing events occurring upon entry to or exit from a software module, said method comprising the steps of:
  generating program code for an entry hook routine for performing a common entry processing function; and
  generating program code for an exit hook routine for performing a common exit processing function.

15. The method, as recited in claim 14, wherein the common entry processing function includes the step of logging an entry hook event to a trace logging facility and wherein the common exit processing function includes the step of logging an exit event to the trace logging facility.

16. The method, as recited in claim 14, further comprising the steps of:
  determining whether said software module contains any data exports; and
  bypassing, for each data export, the entry and exit routines.

17. The method, as recited in claim 14, further comprising the step of generating program code for performing the following steps for each entry point of the software module:
  jumping to the entry hook routine; and
  passing parameters to the entry hook routine including information for indicating whether the exit hook routine will be performed.

18. The method, as recited in claim 14, further comprising the steps of:
  generating a return address table having addressable entries; and
  generating a return address function table having an exit function for each entry of the return address table.

19. The method, as recited in claim 18, further comprising the steps of:
  determining whether the exit hook routine will be performed; and
  if the exit hook routine will be performed, then allocating an entry from the return address table.

20. The method, as recited in claim 19, further comprising the steps of:
  calling, from a caller, the name of the software module to call the shadow software module; and
  storing the caller's return address on a stack.

21. The method, as recited in claim 20, further comprising the steps of:
  removing the caller's return address from the stack;
  storing the caller's return address in the allocated entry of the return address table; and
  storing, in the stack, a return address of an exit function corresponding to the allocated entry.

22. The method, as recited in claim 21, further comprising the steps of:
  returning, using the return address of the exit function in the stack, to the exit function corresponding to the allocated entry in the return address table;
  calling, by the exit function, the exit hook routine;
  storing the return address of the exit function in the stack;
  retrieving the caller's return address from the allocated entry of the return address table corresponding to the exit function; and
  returning to the caller.

23. The method, as recited in claim 14, wherein said software module and said shadow software module are dynamic link libraries.

24. The method, as recited in claim 14, wherein said software module and said shadow software module are object modules.

25. A computer program product, comprising:
   a program storage device readable by a computer system tangibly embodying a program of instructions executable by said computer system, said program of instructions including:
   a software module; and
   a shadow software module for tracing events occurring upon entry to or exit from the software module.

26. The method, as recited in claim 25, wherein said software module and said shadow software module are dynamic link libraries.

27. The method, as recited in claim 25, wherein said software module and said shadow software module are object modules.

28. A computer program product, comprising:
   a program storage device readable by a computer system tangibly embodying a program of instructions executable by said computer system, said program of instructions including:
   a software module having a name;
   means for generating a shadow software module having the same name as the software module for tracing events occurring upon entry to or exit from the software module; and
   means for renaming the software module to thereby avoid modifications to the software module.

29. The computer program product as recited in claim 28, wherein said software module and said shadow software module are dynamic link libraries.

30. The computer program product, as recited in claim 28, wherein said software module and said shadow software module are object modules.

31. A computer program product, comprising:
   a program storage device readable by a computer system tangibly embodying a program of instructions executable by said computer system to generate a shadow software module for tracing events occurring upon entry to or exit from a named software module, said program of instructions implementing the following method:
   generating program code for an entry hook routine for performing a common entry processing function; and
   generating program code for an exit hook routine for performing a common exit processing function.

32. The computer program product, as recited in claim 31, wherein the common entry processing function includes the step of logging an entry hook event to a trace logging facility and wherein the common exit processing function includes the step of logging an exit event to the trace logging facility.

33. The computer program product, as recited in claim 31, further including the steps of:
   determining whether said software module contains any data exports; and
   bypassing, for each data export, the entry and exit routines.

34. The computer program product, as recited in claim 31, further comprising the step of generating program code for performing the following steps for each entry point of the software module:
   jumping to the entry hook routine; and
   passing parameters to the entry hook routine including information for indicating whether the exit hook routine will be performed.

35. The computer program product, as recited in claim 31, further comprising the steps of:
   generating a return address table having addressable entries; and
   generating a return address function table having an exit function for each entry in the return address table.

36. The computer program product, as recited in claim 35, further comprising the steps of:
   determining whether the exit hook routine will be performed; and
   if the exit hook routine will be performed, then allocating an entry from the return address table.

37. The computer program product, as recited in claim 36, further comprising the steps of:
   calling, from a caller, the name of the software module to call the shadow software module and storing the caller's return address on a stack.

38. The computer program product, as recited in claim 37, further comprising the steps of:
   removing the caller's return address from the stack;
   storing the caller's return address in the allocated entry of the return address table; and
   storing, in the stack, the return address of an exit function corresponding to the allocated entry.

39. The computer program product, as recited in claim 38, further comprising the steps of:
   returning, using the return address of the exit function in the stack, to the exit function corresponding to the allocated entry in the return address table;
   calling, by the exit function, the exit hook routine;
   storing the return address of the exit function in the stack;
   retrieving the caller's return address from the allocated entry in the return address table corresponding to the exit function; and
   returning to the caller.

40. The computer program product, as recited in claim 31, wherein said software module and said shadow software module are dynamic link libraries.

41. The computer program product, as recited in claim 31, wherein said software module and said shadow software module are object modules.

42. An information handling system, comprising:
   at least one processor;
   memory operably associated with said processor;
   an application program stored in said memory, said application program including a software module; and
   a shadow software module stored in said memory for tracing events occurring upon entries to or exits from said software module.

43. The information handling system, as recited in claim 42, wherein said shadow software module comprises:
   an entry hook routine for performing a common entry processing function; and
   an exit hook routine for performing a common exit processing function.

44. The information handling system, as recited in claim 43, wherein said common entry processing function includes means for logging an entry hook event to a trace logging facility, and said common exit processing function includes means for logging an exit hook event to said trace logging facility.

45. The information handling system, as recited in claim 43, further comprising:

means for determining whether said software module contains any data exports; and means for bypassing, for each data export, said entry and exit routines.

46. The information handling system, as recited in claim 43, wherein said shadow software module further comprises:

a return address table having addressable entries; and a return address function table having an exit function for each entry in the return address table.

47. The information handling system, as recited in claim 46, further comprising:

means for determining whether said exit hook routine will be performed; and means for allocating an entry from said return address table if said exit hook routine will be performed.

48. The information handling system, as recited in claim 43, wherein said shadow software module comprises:

means for jumping, for each entry point of the software module, to said entry hook routine; and means for passing information for indicating whether the exit hook routine will be performed to said entry hook routine.

49. The information handling system, as recited in claim 48, further comprising:

means for calling, from a caller, the name of said software module to thereby call said shadow software module; and means for storing a return address corresponding to said caller on a stack.

50. The information handling system, as recited in claim 49, further comprising:

means for removing the caller's return address from the stack;

means for storing the caller's return address in the allocated entry of the return address table; and means for storing, in the stack, a return address of an exit function corresponding to the allocated entry.

51. The information handling system, as recited in claim 50, further comprising:

means for returning, using the return address of the exit function in the stack, to the exit function corresponding to the allocated entry in the return address table;

means for calling, by the exit function, the exit hook routine;

means for storing the return address of the exit function in the stack;

means for retrieving the caller's return address from the allocated entry in the return address table corresponding to the exit function; and means for returning to the caller.

52. The information handling system, as recited in claim 42, further comprising:

means for renaming the software module to a new name;

means for determining whether other software modules have the same name as the new name; and means for renaming the software module until no other software modules have the same name as the new name.

53. The information handling system, as recited in claim 42, wherein said software module and said shadow software module are dynamic link libraries.

54. The information handling system, as recited in claim 42, wherein said software module and said shadow software module are object modules.

* * * * *